(12) United States Patent
Zhang et al.

(10) Patent No.: US 9,337,985 B2
(45) Date of Patent: *May 10, 2016

(54) METHOD AND APPARATUS FOR DIFFERENTIAL ENCODING OF CQI IN COOPERATIVE MULTIPOINT COMMUNICATION SYSTEMS

(71) Applicant: MARVELL WORLD TRADE LTD., St. Michael (BB)

(72) Inventors: Yan Zhang, Palo Alto, CA (US); Krishna Srikanth Gomadam, Santa Clara, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,673

(22) Filed: Apr. 28, 2015

(65) Prior Publication Data

US 2015/0236838 A1 Aug. 20, 2015

Related U.S. Application Data

(63) Continuation of application No. 13/672,727, filed on Nov. 9, 2012, now Pat. No. 9,031,597.

(60) Provisional application No. 61/558,405, filed on Nov. 10, 2011.

(51) Int. Cl.
*H04B 7/00* (2006.01)
*H04B 1/00* (2006.01)
(Continued)

(52) U.S. Cl.
CPC ............ *H04L 5/0057* (2013.01); *H04L 5/0035* (2013.01); *H04W 24/02* (2013.01)

(58) Field of Classification Search
CPC .................................. H04B 15/00; H04B 7/00
USPC .............. 455/517, 519, 63.1, 67.13; 370/328, 370/335, 280, 252
See application file for complete search history.

(56) References Cited

U.S. PATENT DOCUMENTS

2008/0069031 A1* 3/2008 Zhang et al. ................... 370/328
2010/0271968 A1* 10/2010 Liu ...................... H04L 25/0202
370/252

(Continued)

FOREIGN PATENT DOCUMENTS

CN 101764681 A 6/2010
WO 2011034321 A2 3/2011
(Continued)

OTHER PUBLICATIONS

U.S. Appl. No. 13/888,385 Office Action dated Oct. 19, 2015.
(Continued)

*Primary Examiner* — Tilahun B Gesesse

(57) ABSTRACT

A method includes receiving in a mobile communication terminal signals from multiple cells that coordinate transmission of the signals with one another in a Cooperative Multipoint (CoMP) scheme. At least first and second Channel Quality Indicators (CQIs), for respective communication channels over which the signals are received, are calculated in the terminal based on the received signals. The second CQI is differentially encoded relative to the first CQI. Feedback information, including the first CQI and the differentially-encoded second CQI, is transmitted from the terminal.

14 Claims, 2 Drawing Sheets

(51) Int. Cl.
*H04B 7/02* (2006.01)
*H04B 17/00* (2015.01)
*H04W 4/00* (2009.01)
*H04L 5/00* (2006.01)
*H04W 24/02* (2009.01)

(56) References Cited

U.S. PATENT DOCUMENTS

| | | | |
|---|---|---|---|
| 2011/0249643 A1 | 10/2011 | Barbieri et al. | |
| 2011/0250885 A1* | 10/2011 | Zarri et al. | 455/435.1 |
| 2012/0281556 A1* | 11/2012 | Sayana | H04B 7/024 370/252 |
| 2013/0122953 A1* | 5/2013 | Zhang et al. | 455/517 |
| 2013/0208678 A1 | 8/2013 | Zhang | |
| 2013/0250885 A1* | 9/2013 | Davydov | H04B 7/024 370/329 |
| 2013/0322393 A1 | 12/2013 | Kishiyama | |
| 2013/0336214 A1* | 12/2013 | Sayana et al. | 370/328 |
| 2014/0056156 A1 | 2/2014 | Jongren | |

FOREIGN PATENT DOCUMENTS

| | | |
|---|---|---|
| WO | 2011085230 A2 | 7/2011 |
| WO | 2012028204 A1 | 3/2012 |

OTHER PUBLICATIONS

Liu et al., "Low Complexity MMSE Vector Precoding Using Lattice Reduction for MIMO Systems", IEEE Conference on Communications (ICC'07), pp. 2598-2603, Jun. 24-28, 2007.

European Application No. 13787645.4 Search Report dated Dec. 3, 2015.

* cited by examiner

METHOD AND APPARATUS FOR DIFFERENTIAL ENCODING OF CQI IN COOPERATIVE MULTIPOINT COMMUNICATION SYSTEMS

CROSS-REFERENCE TO RELATED APPLICATIONS

This application is a continuation of U.S. patent application Ser. No. 13/672,727, filed Nov. 9, 2012, which claims the benefit of U.S. Provisional Patent Application 61/558,405, filed Nov. 10, 2011. The disclosures of these related applications are incorporated herein by reference.

FIELD OF THE DISCLOSURE

The present invention relates generally to wireless communication, and particularly to methods and systems for Multiple-Input Multiple-Output (MIMO) channel feedback.

BACKGROUND

In some MIMO communication systems, multiple cells use Cooperative Multipoint (CoMP) transmission schemes for coordinating downlink MIMO transmissions to User Equipment (UEs). Third Generation Partnership Project (3GPP) Long Term Evolution—Advanced (LTE-A) systems, for example, use or contemplate the use of multiple CoMP modes such as Dynamic Point Selection (DPS), Dynamic Point Blanking (DPB), Cooperative beamforming (CB) and Joint Transmission (JT). The CoMP modes used in LTE-A are specified, for example, in "3rd Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference. When using CoMP, the cooperating cells typically configure their transmissions based on channel feedback provided by the UEs.

The description above is presented as a general overview of related art in this field and should not be construed as an admission that any of the information it contains constitutes prior art against the present patent application.

SUMMARY

An embodiment that is described herein provides a method including receiving in a mobile communication terminal signals from multiple cells that coordinate transmission of the signals with one another in a Cooperative Multipoint (CoMP) scheme. At least first and second Channel Quality Indicators (CQIs), for respective communication channels over which the signals are received, are calculated in the terminal based on the received signals. The second CQI is differentially encoded relative to the first CQI. Feedback information, including the first CQI and the differentially-encoded second CQI, is transmitted from the terminal.

In some embodiments, calculating the CQIs includes identifying a strongest cell, whose signals are received in the terminal with a strongest signal strength among the multiple cells, and calculating the first CQI for a communication channel from the strongest cell to the terminal. In an embodiment, calculating the CQIs includes calculating the first and second CQIs for respective first and second communication channels from first and second ones of the cells to the terminal.

In a disclosed embodiment, calculating the CQIs includes calculating one of the first and second CQIs for a communication channel from one of the cells to the terminal, and calculating the other of the first and second CQIs for an aggregate communication channel from the multiple cells to the terminal. In another embodiment, calculating the CQIs includes calculating the first or the second CQI for a communication channel from one of the cells that is designated for fallback to single-transmission-point transmission to the terminal.

In yet another embodiment, differentially encoding the second CQI includes encoding a difference between the second CQI and the first CQI, such that the differentially-encoded second CQI includes a smaller number of bits than the second CQI. In still another embodiment, differentially encoding the second CQI includes representing the differentially-encoded second CQI using no more than three bits. In an alternative embodiment, differentially encoding the second CQI includes representing the differentially-encoded second CQI using no more than two bits.

There is additionally provided, in accordance with an embodiment that is described herein, apparatus including a receiver, processing circuitry and a transmitter. The receiver is configured to receive signals from multiple cells that coordinate transmission of the signals with one another in a Cooperative Multipoint (CoMP) scheme. The processing circuitry is configured to calculate, based on the received signals, at least first and second Channel Quality Indicators (CQIs) for respective communication channels over which the signals are received, and to differentially encode the second CQI relative to the first CQI. The transmitter is configured to transmit feedback information including the first CQI and the differentially-encoded second CQI.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In a typical CoMP system, a group of cells in a suitable wireless communication network, such as a cellular network, transmits downlink MIMO signals to mobile communication terminals in coordination. The cells, or a central scheduler, configure the downlink signals based on channel feedback that is provided by the terminals.

In various CoMP modes, the terminal calculates and reports feedback for multiple communication channels, e.g., for each individual cell in the group and/or for the aggregate MIMO channel from the entire group of cells. The feedback typically comprises parameters such as Channel Quality Indicators (CQIs) for the various channels. Channel feedback of this sort is often of considerable data size, and reporting channel feedback for the various channels consumes considerable signaling resources on the uplink channels of the system.

Embodiments that are described herein provide improved channel feedback schemes for use in CoMP MIMO systems. In some embodiments, instead of reporting the actual multiple CQI values, the terminal encodes one or more of the CQIs differentially. In a typical differential encoding scheme, the terminal provides a data rich report of the actual value of some reference CQI, and the differences between the other CQIs and the reference CQI. Since in many CoMP scenarios the differences between the various CQIs are small, reporting the CQIs using differential encoding can be carried out using a small number of bits and with little or no performance degradation.

When using the disclosed schemes, high-quality feedback can be provided to the different cells in a CoMP network system using modest uplink signaling resources. Several examples of feedback schemes that use differential encoding of CQI, for use in various CoMP modes, are described below. The embodiments described herein refer mainly to Joint Transmission (JT) CoMP. The disclosed techniques, however, are also applicable in other CoMP modes such as CB or DPS.

Figure 1:
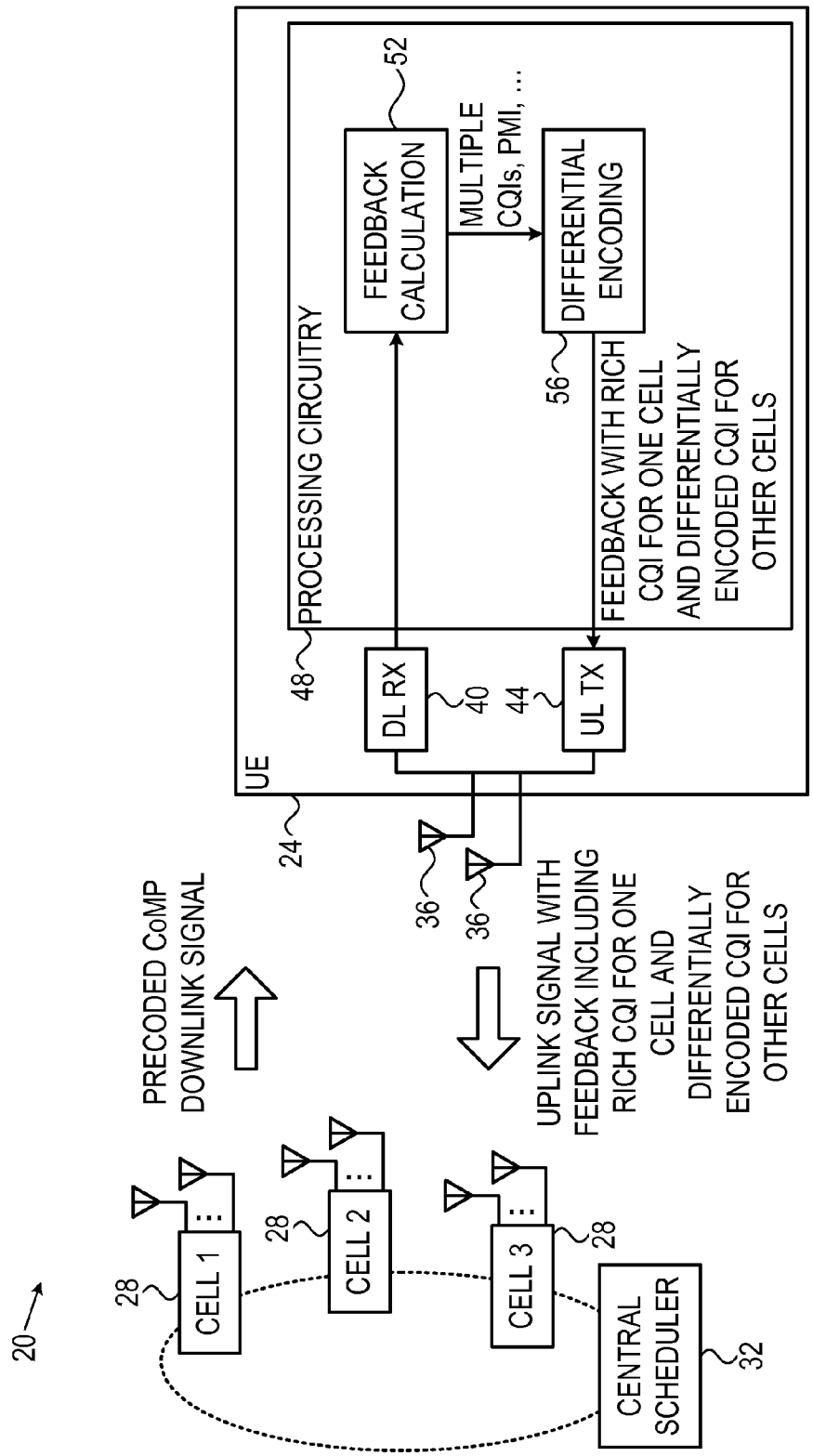
FIG. 1 is a block diagram that schematically illustrates a MIMO communication system that uses CoMP, in accordance with an embodiment that is described herein.

FIG. 1 is a block diagram that schematically illustrates a Cooperative Multipoint (CoMP) communication system 20, in accordance with an embodiment that is described herein. In the present example, system operates in accordance with Third Generation Partnership Project (3GPP) Long Term Evolution—Advanced (LTE-A) specifications. In alternative embodiments, system 20 may operate in accordance with any other suitable communication protocol in which cells coordinate transmission with one another, such as, for example, WiMAX.

In the embodiment of FIG. 1, system 20 comprises a mobile communication terminal 24 (referred to in LTE-A terminology as User Equipment—UE) and three cells 28 (base stations) denoted CELL1, CELL2 and CELL3. The terms cell, base station and Transmission Point (TP) are used interchangeably herein. The choice of a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. Depending on the CoMP mode or on other factors, the cells may cooperate in beamforming, beam activation and deactivation, transmission scheduling or other tasks. A group of cells that cooperate in this manner, such as CELL1, CELL2 and CELL3, is referred to as a cooperating set. In various embodiments, cells 28 may use CoMP modes such as DPS, DPB, JT, CB, and possibly alternate between different modes over time.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions, in an embodiment. In some embodiments the central scheduler also selects the appropriate CoMP mode, and the cell or cells in the set that will transmit to a UE.

Central scheduler 32 typically selects the CoMP mode, the transmitting cell or cells, and/or the precoding vectors, based on channel feedback that is received from the UEs. In some embodiments, the UEs encode at least part of their channel feedback using differential encoding, as will be explained in detail further below.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the received signals. Among other tasks, processing circuitry 48 calculates the channel feedback for various communication channels over which downlink signals are transmitted to the UE, and formats the feedback information to be transmitted to cells 28. Processing circuitry 48 provides the feedback information to uplink transmitter 44, which transmits the feedback information to cells 28.

In the present embodiment, processing circuitry 48 comprises a feedback calculation module 52, which uses calculates the channel feedback using one or more received downlink signals. A differential encoding module 56 applies differential encoding to at least part of the channel feedback, e.g., to Channel Quality Indicators (CQI) estimated by module 52 for the different cells. Module 56 formats the feedback information, including the differentially-encoded CQI.

In some embodiments, each Transmission Point (TP) in the group of cooperating cells transmits respective reference signals, and UE 24 calculates the channel feedback by measuring the reference signals. These reference signals are referred to as Channel State Information Reference Signals (CSI-RS), and each cell is also referred to as a CSI-RS resource.

The UE configuration seen in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, various elements of UE 24 are implemented in software, or using a combination of hardware and software elements.

In some embodiments, various UE elements, such as various elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, cells 28 transmit signals to UE 24 using Joint Transmission (JT) CoMP. In this mode, multiple cells 28 transmit the same data jointly to the UE, so as to effectively produce a large-baseline MIMO transmission from the transmit antennas of the multiple cells.

In various embodiments, system 20 may use various feedback schemes when operating in the JT CoMP mode. Example feedback schemes are referred to herein as individual feedback, aggregated feedback and combined feedback. When using individual feedback, the UE calculates and reports the following feedback information:

Respective Precoding Matrix Indicator (PMI) for each CSI-RS resource.
Respective Channel Quality Indicator (CQI) for each CSI-RS resource.

Relative phases between the CSI-RS resources.

In an embodiment, UE 24 calculates and reports these parameters per spectral sub-band. Without differential encoding, and assuming an allocation of four bits for each CQI, four bits for each PMI and two bits for each inter-CSI-RS phase, the total signaling overhead is 4n+4n+2(n−1) bits per sub-band, wherein n denotes the number of CSI-RS resources in the group.

The aggregated feedback scheme typically refers to the aggregated or composite MIMO channel from the transmit antennas of the entire group of cooperating cells. When using aggregated feedback, the UE calculates and reports the following feedback information:

Respective PMI for each CSI-RS resource.

Aggregated CQI for the aggregated MIMO channel between all the CSI-RS resources and the UE.

A single CQI (referred to as single-TP CQI) for one of the CSI-RS resources, for use in case of fallback to non-CoMP transmission (i.e., for cases where for some reason system 20 stops using CoMP for transmitting to the UE and reverts to single-TP transmission).

Relative phases between the CSI-RS resources.

In an embodiment, these parameters are calculated and reported per spectral sub-band. Without differential encoding, and assuming an allocation of four bits for each PMI, four bits for the aggregated CQI, four bits for the single-TP CQI and two bits for each inter-CSI-RS phase, the total signaling overhead is 4n+4+4+2(n−1) bits per sub-band.

The combined feedback typically comprises a hybrid scheme that reports one or more parameters related to individual feedback, and one or more parameters related to aggregated feedback. When using combined feedback, UE 24 calculates and reports the following feedback information:

Respective PMI for each CSI-RS resource.

Aggregated CQI for the aggregated MIMO channel between all the CSI-RS resources and the UE.

Respective Channel Quality Indicator (CQI) for each CSI-RS resource.

Relative phases between the CSI-RS resources.

In an embodiment, The UE calculates and reports these parameters per spectral sub-band. Without differential encoding, and assuming an allocation of four bits for each PMI, four bits for the aggregated CQI and two bits for each inter-CSI-RS phase, the total signaling overhead is 4n+4n+4+2(n−1) bits per sub-band.

The three feedback schemes described above are chosen and defined solely by way of example. In alternative embodiments, the disclosed techniques can be used with any other suitable feedback scheme that reports any other suitable parameters.

As can be seen in the examples above, the feedback information in CoMP comprises a large number of bits, which consume considerable signaling resources on the uplink channels from UE 24 to cells 28. A large portion of this feedback overhead relates to reporting the multiple CQIs. The overhead is particularly problematic when the number of cooperating cells in the group is large.

In many practical CoMP scenarios, however, the multiple CQIs reported by the UE in a given feedback report have similar values. (In an embodiment, the CQI computed for a certain cell comprises an integer number that indicates the preferred Modulation and Coding Scheme (MCS) to be used by that cell. The CQI is roughly correlative to the signal-to-noise-and-interference ratio of the signal received from the cell.)

In some embodiments, processing circuitry of UE 24 exploits the small differences between the CQIs of the various channels to reduce uplink signaling, by using differential encoding. In these embodiments, differential encoding module 56 applies differential encoding to the CQIs calculated by feedback calculation module 52. Typically, module 56 selects one of the CQIs to serve as a reference CQI. When formulating the feedback information, module 56 reports full, rich, un-encoded CQI report for the reference CQI, e.g., the actual value of the reference CQI, and the differences between the other CQIs and the reference CQI. In various embodiments, any of the cooperating cells can be selected as the cell whose CQI serves as the reference CQI.

In the embodiments described herein, module 56 identifies the strongest CQI (i.e., the CQI of the CSI-RS resource that is received with the strongest signal strength among the CSI-RS resources in the cooperating group of cells), and chooses this strongest CQI to serve as the reference CQI. Alternatively, however, module 56 may choose any other CQI of any other cell to serve as the reference CQI.

In the context of the present patent application and in the claims, the term "difference between CQIs" refers to any suitable way of expressing the variation or delta between the CQIs, including, for example and without limitation, additive or multiplicative differences.

Because of the small differences between the CQI values, it is possible to allocate to the differentially-encoded CQIs only a small number of bits with little or no loss of information. The set of differential CQI values is typically chosen based on the range of CQI differences among the various CSI-RS resources, and/or the typical differences between the aggregated and single-TP CQIs. In some embodiments that are described below, module 56 represents each differentially-encoded CQI using three bits. In other disclosed embodiments, module 56 represents each differentially-encoded CQI using only two bits. Further alternatively, any other suitable number of bits can be used for representing the differentially-encoded CQIs.

In an example embodiment, when using individual feedback, module 56 produces the following feedback information:

CQI for the strongest CSI-RS resource (used as reference CQI), and the index of this CSI-RS resource.

Differentially-encoded CQIs for the other CSI-RS resources.

In an embodiment, module 56 reports each differentially-encoded CQI using two bits, according to the following table:

TABLE 1

Example 2-bit differential encoding of CQI

| Difference in CQI index from reference CQI | Differentially-encoded CQI in feedback information |
|---|---|
| 0 | 0 |
| −1 | 1 |
| −2 | 2 |
| ≤−3 | 3 |

In this embodiment, the total signaling overhead is 4n+4+2(n−1)+2+2(n−1) bits per sub-band, in comparison with 4n+4n+2(n−1) bits per sub-band without differential encoding. The overhead reduction is 2n−4 bits per sub-band, which is a considerable reduction.

In an alternative embodiment relating to individual feedback, module 56 reports each differentially-encoded CQI using three bits, according to the following table:

TABLE 2

Example 3-bit differential encoding of CQI

| Difference in CQI index from reference CQI | Differentially-encoded CQI in feedback information |
|---|---|
| 0 | 0 |
| −1 | 1 |
| −2 | 2 |
| −3 | 3 |
| −4 | 4 |
| −5 | 5 |
| −6 | 6 |
| ≤−7 | 7 |

In this embodiment, the total signaling overhead is 4n+4+3(n−1)+2+2(n−1) bits per sub-band, in comparison with 4n+4n+2(n−1) bits per sub-band without differential encoding. The overhead reduction is thus n−3 bits per sub-band.

In an example embodiment, when using aggregated feedback, module 56 produces the following feedback information:
  Aggregated CQI used as reference CQI.
  Differentially-encoded single-TP CQI for one of the CSI-RS resources, for use in case of fallback to non-CoMP operation.
  Index of the CSI-RS resource whose single-TP CQI is reported.

In an alternative embodiment relating to aggregated feedback, module 56 produces the following feedback information:
  Single-TP CQI for one of the CSI-RS resources, for use in case of fallback to non-CoMP operation, used as reference CQI.
  Differentially-encoded aggregated CQI.
  Index of the CSI-RS resource whose single-TP CQI is reported.

In these embodiments, module 56 reports the differentially-encoded CQI using three bits according to Table 2 above, or using two bits according to Table 1 above. The total signaling overhead is 4n+4+3+2(n−1)+2 (the extra 2 bits for index of the CSI-RS resource whose single-TP CQI is reported) bits per sub-band for Table 1 (differential encoding with three bits), or 4n+4+2+2(n−1)+2 bits per sub-band for Table 2 (differential encoding with two bits), providing a saving of 2 bits or 1 bits per sub-band, respectively.

In another example embodiment, when using combined feedback, module 56 produces the following feedback information:
  Aggregated CQI used as reference CQI.
  Differentially-encoded CQI for each CSI-RS resource.

In this embodiment, module 56 reports the differentially-encoded CQI using three bits according to Table 1 above, or using two bits according to Table 2 above. The total signaling overhead is 4n+2n+2(n−1)+4 bits per sub-band for Table 2 (differential encoding with three bits), or 4n+3n+2(n−1)+4 bits per sub-band for Table 1 (differential encoding with two bits), providing a saving of 2n bits or n bits per sub-band, respectively.

In an alternative embodiment relating to combined feedback, module 56 produces the following feedback information:
  CQI of strongest CSI-RS resource, used as reference CQI.
  Differentially-encoded aggregated CQI.
  Differentially-encoded CQI for each CSI-RS resource other than the strongest (reference) CSI-RS resource.
  Index of the strongest CSI-RS resource.

In this embodiment, module 56 may report each differentially-encoded CQIs (single-TP or aggregated) using two bits according to the following table:

TABLE 3

Example 2-bit differential encoding of CQI

| Difference in CQI index from reference CQI | Differentially-encoded CQI in feedback information |
|---|---|
| 0 | 0 |
| 1 | 1 |
| ≥2 | 2 |
| ≤−1 | 3 |

Alternatively, module 56 may report each differentially-encoded CQIs (single-TP or aggregated) using three bits according to the following table:

TABLE 4

Example 3-bit differential encoding of CQI

| Difference in CQI index from reference CQI | Differentially-encoded CQI in feedback information |
|---|---|
| 0 | 0 |
| 1 | 1 |
| 2 | 2 |
| 3 | 3 |
| ≥4 | 4 |
| −1 | 5 |
| −2 | 6 |
| ≤−3 | 7 |

The total signaling overhead in these embodiments is 4n+2n+2(n−1)+6 bits per sub-band for Table (differential encoding with three bits), or 4n+3n+2(n−1)+6 bits per sub-band for Table 4 (differential encoding with two bits), providing a saving of 2n−2 bits or n−2 bits per sub-band, respectively.

The differential encoding tables and feedback formats described above are given purely by way of example. In alternative embodiments, module 56 in UE 24 may use any other suitable differential encoding values and feedback formats.

Figure 2:
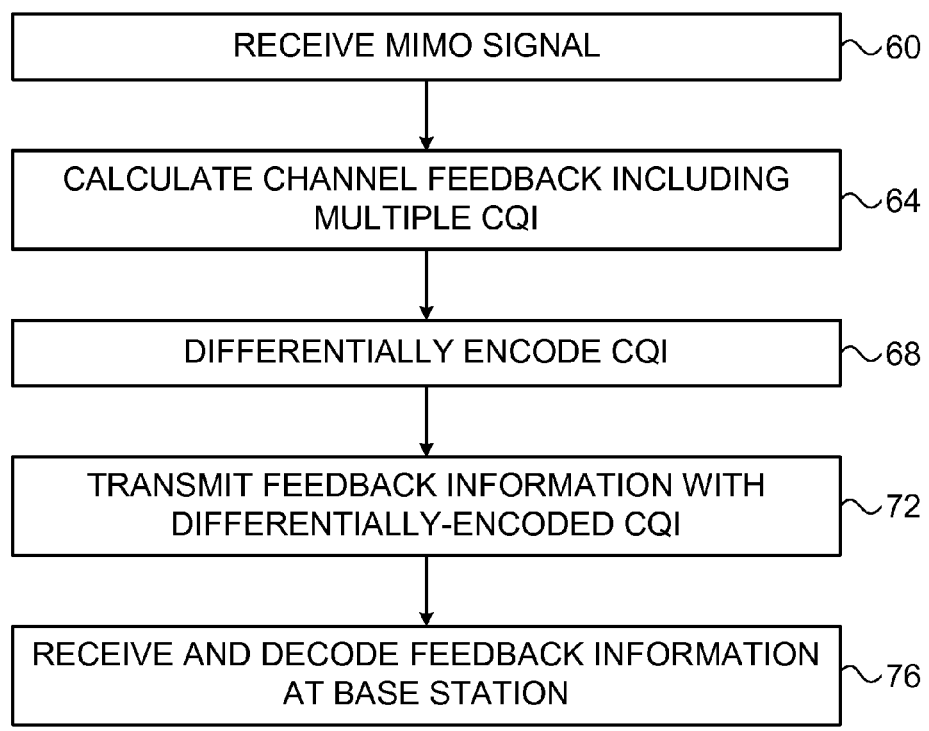
FIG. 2 is a flow chart that schematically illustrates a method for channel feedback in a MIMO communication system that uses CoMP, in accordance with an embodiment that is described herein.

FIG. 2 is a flow chart that schematically illustrates a method for channel feedback in system 20, in accordance with an embodiment that is described herein. The method begins with receiver 40 of UE 24 receiving a CoMP MIMO signal from cells 28, at a downlink reception operation 60.

Feedback calculation module 52 in processing circuitry 48 calculates channel feedback based on the received CoMP signal, at a feedback calculation operation 64. The feedback information comprises at least two CQI values, as explained above. Differential encoding module 56 applies differential encoding to all but one of the CQI values, at an encoding operation 68, to produce feedback information for feeding back to cells 28. As explained above, one of the CQIs is selected to serve as a reference CQI for which a rich CQI report is transmitted. The other CQIs are differentially-encoded relative to the reference CQI.

Transmitter 44 transmits the feedback information, including the differentially-encoded CQI, to cells 28, at an uplink transmission operation 72. Cells and/or central scheduler 32 receive and decode the feedback information, at a feedback reception operation 76. The cells and/or central scheduler use the feedback information for configuring subsequent CoMP transmission to the UE.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer software product, the product comprising a tangible non-transitory computer-readable medium in which program instructions are stored, which instructions, when read by a processor, cause the processor to:
   calculate, based on signals received by a receiver from multiple cells that coordinate transmission of the signals with one another in a Cooperative Multipoint (CoMP) scheme, at least a first Channel Quality Indicator (CQI) and a second CQI for respective communication channels over which the signals are received, wherein the first CQI or the second CQI is calculated for a communication channel from one of the cells that is designated for fallback to single-transmission-point transmission to the receiver;
   differentially encode the second CQI relative to the first CQI; and
   provide the first CQI and the differentially-encoded second CQI to a transmitter for transmitting feedback information comprising the first CQI and the differentially-encoded second CQI.

2. The product according to claim 1, wherein the instructions cause the processor to:
   identify a strongest cell, whose signals are received in the receiver with a strongest signal strength among the multiple cells; and
   calculate the first CQI for a communication channel from the strongest cell to the receiver.

3. The product according to claim 1, wherein the instructions cause the processor to calculate the first and second CQIs for respective first and second communication channels from first and second ones of the cells to the receiver.

4. The product according to claim 1, wherein the instructions cause the processor to:
   calculate one of the first and second CQIs for a communication channel from one of the cells to the receiver; and
   calculate the other of the first and second CQIs for an aggregate communication channel from the multiple cells to the receiver.

5. The product according to claim 1, wherein the instructions cause the processor to differentially encode the second CQI by encoding a difference between the second CQI and the first CQI, such that the differentially-encoded second CQI comprises a smaller number of bits than the second CQI.

6. The product according to claim 1, wherein the instructions cause the processor to represent the differentially-encoded second CQI using no more than three bits.

7. The product according to claim 1, wherein the instructions cause the processor to represent the differentially-encoded second CQI using no more than two bits.

8. An apparatus, comprising:
   means for receiving, in a mobile communication terminal, signals from multiple cells that coordinate transmission of the signals with one another in a Cooperative Multipoint (CoMP) scheme;
   means for calculating, based on the received signals, at least a first Channel Quality Indicator (CQI) and a second CQI for respective communication channels over which the signals are received, wherein the first CQI or the second CQI is calculated for a communication channel from one of the cells that is designated for fallback to single-transmission-point transmission to the terminal;
   means for differentially encoding the second CQI relative to the first CQI; and
   means for transmitting feedback information from the terminal, the feedback information comprising the first CQI and the differentially-encoded second CQI.

9. The apparatus according to claim 8, wherein the means for calculating the first CQI and the second CQI comprises:
   means for identifying a strongest cell, whose signals are received in the terminal with a strongest signal strength among the multiple cells; and
   means for calculating the first CQI for a communication channel from the strongest cell to the terminal.

10. The apparatus according to claim 8, wherein the means for calculating the first CQI and the second CQI comprises:
    means for calculating the first and second CQIs for respective first and second communication channels from first and second ones of the cells to the terminal.

11. The apparatus according to claim 8, wherein the means for calculating the first CQI and the second CQI comprises:
    means for calculating one of the first and second CQIs for a communication channel from one of the cells to the terminal; and
    means for calculating the other of the first and second CQIs for an aggregate communication channel from the multiple cells to the terminal.

12. The apparatus according to claim 8, wherein the means for differentially encoding the second CQI comprises:
    means for encoding a difference between the second CQI and the first CQI, such that the differentially-encoded second CQI comprises a smaller number of bits than the second CQI.

13. The apparatus according to claim 8, wherein the means for differentially encoding the second CQI comprises:
    means for representing the differentially-encoded second CQI using no more than three bits.

14. The apparatus according to claim 8, wherein the means for differentially encoding the second CQI comprises:
    means for representing the differentially-encoded second CQI using no more than two bits.

* * * * *